July 11, 1950 — V. V. USHANOFF — 2,514,592

ANTERIOR BRIDGE PLASTIC TEETH

Filed Nov. 29, 1948

INVENTOR:-
VASELEI V. USHANOFF.
By Martin O. Smith
ATTY.

Patented July 11, 1950

2,514,592

UNITED STATES PATENT OFFICE 2,514,592

ANTERIOR BRIDGE PLASTIC TEETH

Vaselei V. Ushanoff, Los Angeles, Calif.

Application November 29, 1948, Serial No. 62,447

6 Claims. (Cl. 32—10)

My invention relates generally to artificial teeth and more particularly to teeth used in the production of anterior bridge work and one of the principal objects of my invention is to form the teeth from suitable plastics, each tooth having a separately formed tie or reinforcement of suitable metal, the ends thereof being exposed on the mesial and distal faces of the tooth in order that the tooth or teeth, may be securely fastened or anchored to one another and/or to the crowns or partial crowns on teeth to sides of the bridge.

A further object of my invention is, to construct the tooth so as to simplify and facilitate its anchorage to another tooth or crown, also to construct and arrange the separately formed metal tie and the parts of the tooth so as to provide a very strong and stable tooth, having maximum resistance to applied strains and stresses, also facilitating and materially decreasing production costs.

With the foregoing and other objects in view, my invention consists in certain novel features of construction and arrangement of parts which will be hereinafter more fully described and claimed and illustrated in the accompanying drawings, in which:

Figure 1:
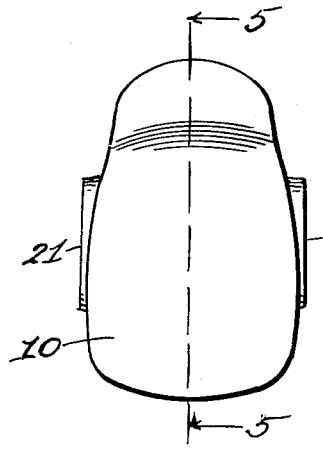
Fig. 1 is a front elevational view of my improved tooth.
Figure 6:
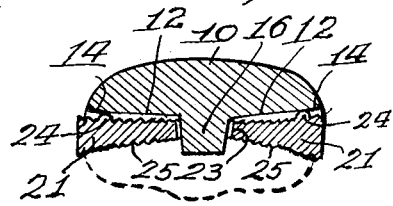
Fig. 6 is a horizontal section taken approximately on a central plane.

Referring by numerals to the accompanying drawings, particularly Figs. 1 and 6 inclusive which show an upper central incisor, 10 designates the tooth body having at its upper end a gingival surface 11, inclined from rear to front.

Formed in the rear face of body 10 is a transverse recess 12, having slightly inclined edges 13 and the end portions of said recess at the sides of the body, are slightly wider and deeper than the intermediate portion, as designed by 14.

From the central portion of recess, notches 15 extend upwardly and downwardly and formed integral with body 10 in the center of recess 12 between said notches, is a stud 16. The edges of notches 15 are preferably inclined slightly to correspond with edges 13.

The reinforcing tie forming a part of my improved tooth consists of a plate 21 of gold or suitable metal shaped to fit in recess 12, with top and bottom extension lugs 22, which occupy notches 15 and a central aperture 23 which receives stud 16.

Figure 2:
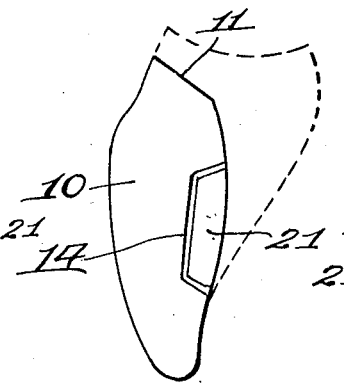
Fig. 2 is a side elevational view.
Figure 3:
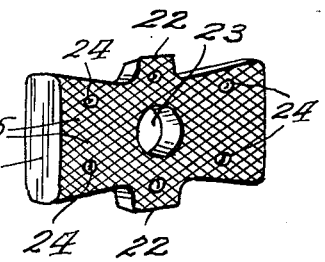
Fig. 3 is a perspective view of the metal tie and reinforcement.
Figure 4:
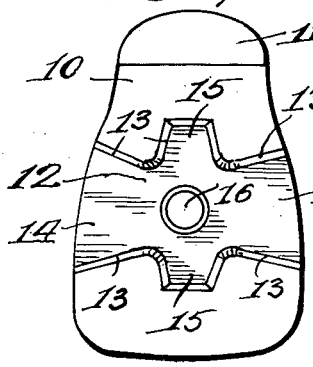
Fig. 4 is a rear elevational view of the body of the tooth, before the metal tie is inserted.
Figure 5:
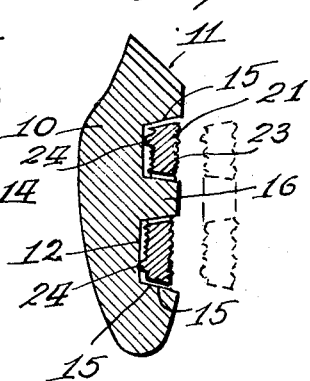
Fig. 5 is a vertical section taken on the line 5—5 of Fig. 1.

The width and thickness of tie 21 is very slightly less than the width and depth of recess in order that when the soft plastic forming the rear portion of the finished tooth (see dotted lines "x" Figs. 2 and 6) a thin layer of said plastic will flow into the narrow spaces between the tie and body 10 and thereby provide a very strong and substantial bond between said tooth body and tie. To insure the spacing of the rear face of tie 21 from the bottom of recess 12, small studs 24 may be provided on the rear face of the tie and to further increase the bond between the body 10 and tie 21, the front and rear faces thereof may be acted upon so as to produce minute ribs, corrugations or grooves 25.

The tie 21 is produced, preferably from gold by casting or by being stamped out with suitable dies and where a bridge involves more than one tooth, the required ties may be formed from a single piece of metal. In using my improved tooth body and tie, the latter is placed in recess 12 and by conventional means, a body of soft plastic is applied, under pressure to the rear face of body 10 over the tie and a portion of said plastic will flow into all the space and interstices between the parts to very effectively bond same to each other when the applied plastic has become set. When hard the exposed surface of the applied plastic may be contoured as desired.

The length of tie 21 when prepared and placed in recess 12, is slightly greater than the length of said recess and thus when the parts of the tooth are assembled for use, the ends of said plate project slightly beyond the mesial and distal faces of the tooth, in order to facilitate the contouring of the outer end faces which are permanently connected by soldering or otherwise to the ends of plates in adjacent teeth or to the crowns of adjacent lateral teeth.

Figure 7:
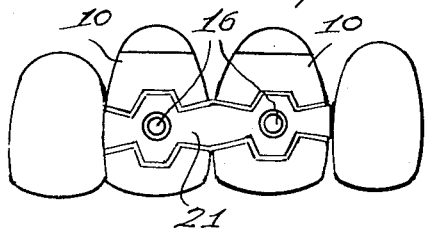
Fig. 7 is a rear elevational view of a bridge comprising a pair of incisor teeth disposed between and connected to the crowns of laterals.

When a single tooth is to function as a bridge, the slightly projecting ends of the tie 21 are contoured and then permanently soldered to the crowns of adjacent teeth. Where two or more teeth form a bridge, the contacting ends of the ties are soldered to each other and the exposed ends of the plates at the end of the bridge are soldered to the crowns of the anchoring teeth (see Fig. 7), or, the two or more ties used may be formed from a single piece of metal.

Figure 8:
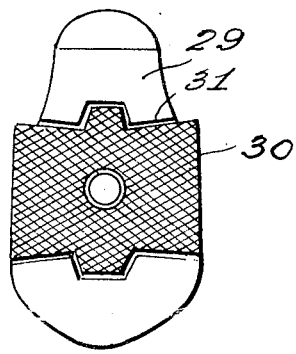
Fig. 8 is a rear elevational view of a cuspid with the inserted tie.

In Fig. 8, I have shown a cuspid 29 with a tie 30 seated in a recess 31 in its rear face and which tie is somewhat shorter and wider than the ties used in incisors.

Teeth constructed in accordance with my invention are preferably formed from suitable plasties, as such materials have ample strength and durability and readily lends themselves to external contouring, finishing and polishing.

Thus, it will be seen that I have provided a reinforced plastic bridge tooth that is simple in structure, inexpensive of manufacture and capable of being easily and firmly anchored to supporting teeth.

Minor changes in the size, form and construction of the various parts of my improved bridge may be made and substituted for those herein shown and described without departing from the spirit of the invention, the scope of which is set forth in the appended claims.

I claim as my invention:

1. A bridge tooth comprising a labial body member provided on its rear face with a transverse recess which increases in width and depth toward its ends, a stud in the center of said recess, there being notches extending upwardly and downwardly from the central portion of said recess, and a transversely disposed metal tie seated in said recess and provided with a central aperture for reception of said stud.

2. The bridge tooth as set forth in claim 1, with the end portions of said tie being of increased width and thickness and exposed on the side faces or said body member.

3. The bridge tooth as set forth in claim 1, and the upper and lower edges of said tie being inclined with respect to the rear face of said body member.

4. The bridge tooth as set forth in claim 1 and spacing lugs on the rear face of said tie.

5. The bridge tooth as set forth in claim 1, and the upper and lower edges of which tie and the adjacent faces of the recess in the body member being spaced apart a slight distance and correspondingly inclined.

6. The bridge tooth as set forth in claim 1, and the diameter of the aperture in said body being slightly greater than the diameter of said stud and the peripheral face of which stud and the face of which aperture are correspondingly inclined.

VASELEI V. USHANOFF.

REFERENCES CITED

The following references are of record in the file of this patent:

UNITED STATES PATENTS

| Number | Name | Date |
|---|---|---|
| 904,601 | Case | Nov. 24, 1908 |
| 1,738,460 | Stark | Dec. 3, 1929 |

FOREIGN PATENTS

| Number | Country | Date |
|---|---|---|
| 8,314 | Great Britain | June 4, 1915 |
| 384,034 | Germany | Nov. 3, 1923 |